3,445,571
HYDROCORTISONE CYCLOHEXYLSULFAMATE, PHARMACEUTICAL COMPOSITIONS THEREOF, AND METHOD OF USE

Ernest J. Sasmor, Yonkers, N.Y., assignor to The Purdue Frederick Company, Westchester County, N.Y., a corporation of New York
No Drawing. Filed May 23, 1966, Ser. No. 552,678
Int. Cl. A61k *17/16;* C07c *169/34*
U.S. Cl. 424—243                                17 Claims This invention relates to a new and novel therapeutic compound formed from hydrocortisone and cyclohexylsulfamic acid, methods for its preparation, pharmaceutical compositions containing the same and the use of the compound and said compositions in the therapy of humans and animals, in order to achieve an elevated blood level of hydrocortisone. A further object of the present invention is to describe a method of increasing the solubility of hydrocortisone in aqueous fluids through the use of cyclohexylsulfamic acid, and the method for achieving an elevated blood level of hydrocortisone by administering the new solubilized hydrocortisone solution to a patient. Specifically, the present invention relates to hydrocortisone cyclohexylsulfamate, the method for its preparation, pharmaceutical compositions containing the same and a method for the use of hydrocortisone cyclohexylsulfamate and pharmaceutical compositions containing the same, to achieve an elevated blood level of hydrocortisone in humans and animals.

Hydrocortisone is known chemically as 17-hydroxycorticosterone and is a well defined adrenocortical steroid with a rapid onset of action. It is used therapeutically in a broad spectrum of pathologic states, wherein it is found to be a most important and valuable drug. While this compound is of unquestioned therapeutic value, there are certain physical and chemical limitations which restrict its use or impose a special burden upon the prescriber so that the full therapeutic benefit of this compound is not achieved. These limitations center principally about the insolubility of hydrocortisone in water and physiologic fluids. The aqueous solubility of hydrocortisone is 0.28 mg. per ml. at 25° C. and this solubility is too low to permit the preparation of more concentrated aqueous solutions of hydrocortisone which are required in certain therapeutic procedures. When concentrations in excess of the aqueous solubility of hydrocortisone are desired, suspensions are presently utilized. These suspensions, while providing an elevated quantity of the active ingredient, do not solve the problem of providing a uniform amount of hydrocortisone per unit dose because of sedimentation which is well known to occur with suspensions. Furthermore, the particle size must be carefully controlled, when such suspensions are intended for use in the eye and the genitourinary tract. Although expensive and time-consuming milling procedures are utilized to reduce the particle size of the suspended solid crystalline hydrocortisone to that of micron particles, these tend to enlarge on standing and thereby become capable of causing a local irritation of the sensitive tissue through mechanical trauma. The special techniques used to obtain the finely divided particles which are used to prepare suspensions as well as the methods which are used to control the particle size, add a disproportionate cost to this important drug.

It was found that hydrocortisone could be solubilized in aqueous fluids by the addition of cyclohexylsulfamic acid and that by achieving this increased solubility the well known limitations of hydrocortisone were eliminated. Cyclohexylsulfamic acid is a well known compound, having a molecular weight of 179.24 and melting 169–170° C. It is also known as cyclohexane sulfamic acid and N-cyclohexylsulfamic acid and is a fairly strong acid and is very sparingly soluble in water, being slowly hydrolyzed by hot water. The sodium and calcium salts of N-cyclohexylsulfamic acid is used as a sugar substitute for diets with restricted sugar intake. Both the salts of cyclohexylsulfamic acid and the free acid are essentially non-toxic. These may be administered to humans and animals in fairly large quantities without interfering with any of the normal physiologic processes. When extremely large quantities are ingested, a mild laxative effect has been observed but no other untoward response.

When hydrocortisone is combined with cyclohexylsulfamic acid, a clear, stable aqueous solution results. This solution contains approximately four times the concentration of hydrocortisone that is present in the normally saturated aqueous solution. The hydrocortisone is not pharmacologically altered so that the full spectrum of adrenocortical steroid activity is obtained when the new solutions are administered to humans and animals. Furthermore, these aqueous solutions are capable of being utilized for further pharmaceutical compounding or these may be administered directly to the patient. Thus, ophthalmic solutions, wet dressings, irrigating solutions, parenteral injections, as well as liquid pharmaceutical preparations, such as syrups and solutions, may be prepared. Solid dosage forms such as suppositories can also be compounded.

An advantage of the new aqueous solutions for ophthalmic and genitourinary usage, as well as for the irrigation of wounds, is that mechanical irritation due to the presence of crystalline insoluble material is avoided.

The solubilization of hydrocortisone by cyclohexylsulfamic acid is achieved by first preparing an alcohol concentrate containing hydrocortisone and cyclohexylsulfamic acid in ratio of two parts hydrocortisone for each part of cyclohexylsulfamic acid. The alcohol concentrate is then diluted with water in a ratio of 1 part concentrate to 19 parts of water and filtered. The filtrate is a clear, homogeneous solution which is stable under the ordinary conditions of storage. The clear solution will be found to contain from 1 mg. to 1.25 mg. of hydrocortisone per ml. of solution, which represents an increase in the solubility of hydrocortisone of approximately 4 times that of the ordinary solubility. The new solution of hydrocortisone has a pH of between pH 2 and pH 3, when freshly prepared, although it may be buffered over the pH range of from pH 2 to pH 5.5, without altering its stability or its properties.

The new solution of hydrocortisone and cyclohexylsulfamic acid may be administered to patients either by the oral route and the rectal route or it may be used locally for instillation into the eye, genitourinary tract as well as by local application to the skin and mucous membranes. This solution may also be used for parenteral injection in humans and animals, since it is capable of being sterilized by the conventional methods. When used for oral administration, syrups are the preferred pharmaceutical dosage form and concentrations as high as 6.25 mg. of hydrocortisone per unit dose (5 ml., 1 teaspoonful), may be obtained. This solution has the further advantage of not requiring sweetening agents since active ingredients already possess a high degree of sweetness. This new solution is safe for administration to patients for whom sugar is contraindicated and where the ordinary sugar syrups cannot be used. Liquid filled capsules may also be utilized for oral administration.

When the rectal use is intended, suppositories are prepared from the solution. Such suppositories are prepared by dispersing the solution in a pharmaceutically acceptable suppository base, as for example, suppository vehicles as polyoxyethylene glycols having a molecular weight of at least 1000, glycerogelatin and cocoa butter. When cocoa butter is being used as the vehicle, it is necessary that a dispersing aid be added to the formulation in order to achieve a uniform distribution of the liquid active ingredient. When suppositories are prepared from the new solution, a concentration ranging from 1 mg. to 6 mg. of hydrocortisone per suppository may be used.

Parenteral solutions are prepared through the use of an aseptic technique together with water-for-injection, as the solvent. The solution is sterilized either by filtration, Tyndallization or autoclaving. In preparing an injection from the solution, a concentration of 1 mg. of hydrocortisone per ml. of solution is preferred, although the range in concentration may be adjusted to meet the individual needs of the patient.

The new solution of hydrocortisone may be instilled into the eye without the inherent dangers and problems of the older product, such as pain due to mechanical irritation and tissue trauma resulting from the suspended particles. The clear solution, when used in the eye, delivers an optimal quantity of hydrocortisone without the occurrence of pain, tissue trauma or local irritation. Furthermore, the amount of solution instilled into the eye will always contain a uniform quantity of hydrocortisone since there is no sedimentation as is observed with suspensions, thereby avoiding both overdosage and underdosage in therapy.

Similarly, the solution may be used to irrigate the genitourinary tract wherein it affords a better therapeutic utilization of the hydrocortisone, since the dissolved hydrocortisone is now directly available to the tissue. The new solution avoids the danger of irritation of the mucous membranes by suspended particles and thereby permits the instillation of the solution even into the narrow vessels often found in genitourinary practice.

When the new solution of hydrocortisone and cyclohexylsulfamic acid is used in therapy it will be found to cause an elevated blood level of hydrocortisone. This elevated blood level is achieved rapidly, since the compound is readily absorbed and permits a more convenient therapy of the patient.

It was unexpectedly found that hydrocortisone combines with cyclohexylsulfamic acid to result in a new compound, hydrocortisone cyclohexylsulfamate, which is soluble in water and has its own unique and distinctive chemical and physical properties. Hydrocortisone cyclohexylsulfamate melts at about 193–197° C. (with decomposition). The compound analyzes in good agreement with its theoretical values to contain 49.4% hydrocortisone and 51.6% cyclohexylsulfamic acid.

Hydrocortisone cyclohexylsulfamate is prepared by refluxing equimolar quantities of hydrocortisone alcohol and cyclohexylsulfamic acid in ethanol solution. After a period of refluxing of about 45 minutes, the solution is allowed to stand overnight after which, the ethanol solvent is concentrated by vacuum distillation to the point where the solution just becomes turbid. The solution is then placed in an ice chest to crystallize and filtered. The solid material is then extracted with hot chloroform. The chloroform extract is distilled to a dry residue which is hydrocortisone cyclohexylsulfamate and melts at 193°–196° C. (dec.). The compound is soluble in water and ethanol, very slightly soluble in chloroform and insoluble in benzene. The pH of an 0.1 percent solution in water is between pH 2.3 and pH 2.6. The compound is stable at ordinary conditions of storage and may be used for further pharmaceutical manufacturing as well as in the therapy in humans and animals by the oral, rectal and parenteral routes, as well as for topical application. When used by the oral route, solutions are a preferred means of administration, although tablets, capsules and granules also may be prepared.

When it is desired to use the compound, hydrocortisone cyclohexylsulfamate parenterally, then solutions of the compound are to be prepared by an aseptic technique and packaged in suitable sealed containers, such as ampules and vials. These may be sterilized by the conventional means of sterilization for such products.

When utilized via the rectal route, the compound is dispersed in a pharmaceutically acceptable suppository vehicle to prepare suppositories of suitable size and shape to permit the administration of a therapeutically sufficient of hydrocortisone cyclohexylsulfamate.

When hydrocortisone cyclohexylsulfamate is intended to be used in local therapy then ophthalmic solutions, irrigating solutions, and wet dressings may be prepared, as well as ointments, creams and lotions.

The new compound possesses the full therapeutic activity of hydrocortisone with the advantage of possessing a greater solubility in aqueous fluids. An increase in the solubility of the hydrocortisone moiety of as much as 4 times, is possible through the use of this new compound. When used in therapy, clear solutions may be prepared, having a range in concentration of from 1 mg. to 12.5 mg. of hydrocortisone cyclohexylsulfamate per unit dose. Hydrocortisone cyclohexylsulfamate is readily absorbed and will be found to result in a rapid elevation of the blood level of hydrocortisone when administered to a patient. The new compound exerts the full spectrum of adrenocortical steroid activity known for hydrocortisone, thereby affording the clinician a new degree of therapeutic flexibility which permits the prescribing of solutions containing hydrocortisone at a higher concentration than was previously possible. Furthermore, the increased solubility permits a more accurate administration of higher amounts of the compound since sedimentation does not occur, thereby avoiding overdosing and underdosing of patient. The following examples illustrate the scope of this invention.

EXAMPLE 1

To a solution of 1.8 gm. of cyclohexylsulfamic acid, dissolved in 100 ml. of anhydrous ethanol, is added a solution of 3.6 gm. of hydrocortisone alcohol, dissolved in 100 ml. of anhydrous ethanol. The mixture is refluxed for a period of at least 45 minutes and then allowed to cool to room temperature. The ethanol solvent is concentrated under vacuum until the volume is reduced to the point of turbidity and the whole is then set aside to crystallize in an ice chest. The insoluble solid material is filtered and extracted with hot chloroform. The chloroform solvent of the extract is removed and the residue dried. The residue is hydrocortisone cyclohexylsulfamate, melting at 193–196° C. The compound is soluble in water (1.25 mg. per ml.), and ethanol; very slightly soluble in chloroform and insoluble in benzene. The pH of a 0.1% solution in water is between pH 2.3 and pH 2.6.

The compound agrees with the theoretical values for its composition, having two parts of hydrocortisone for each part of cyclohexylsulfamic acid. Its molar composition is that of equimolar portions of hydrocortisone and cyclohexylsulfamic acid, respectively. On infrared spectral analysis the compound shows the corresponding bands for hydrocortisone and cyclohexylsulfamate moieties. The compound has a pleasing taste, which is contrastingly different from the well known bitter, disagreeable taste of hydrocortisone. Hydrocortisone cyclohexylsulfamate does not require flavoring additives to mask its taste and the compound is readily acceptable to the patient in its pure state.

Hydrocortisone cyclohexylsulfamate is stable under the ordinary conditions of storage and may be used for further pharmaceutical manufacturing as well as in the therapy of humans and animals by either the oral, rectal, parenteral, or topical routes of administration.

EXAMPLE 2

In place of the anhydrous ethanol described in Example 1, there may be substituted an anhydrous liquid alkanol of from 1 through 4 carbons in chain length. The volume of alcohol to be used is the same as that described in Example 1 above. The remainder of the steps being the same and the product obtained is hydrocortisone cyclohexylsulfamate, having the properties described in Example 1, above.

EXAMPLE 3

In order to increase the solubility of hydrocortisone, in aqueous and physiologic fluids, cyclohexylsulfamic acid may be used as a solubilizing aid. A solution concentrate of 1 part cyclohexylsulfamic acid in 100 parts of ethanol is prepared. The solution is warmed to about 50° C. To this is then added small increments of hydrocortisone alcohol up to a quantity, equal to two times the weight of cyclohexylsulfamic acid used. The mixture is stirred after the addition of each portion of hydrocortisone alcohol until the solution is clear. The solution is allowed to cool to room temperature and filtered. The pH of this solution is approximately pH 2.3. The solution concentrate is then diluted with distilled water in the ratio of 1 part solution concentrate and 19 parts of distilled water, so that the total volume of the aqueous diluted solution concentrate is now 20 times the starting volume.

The solution thus obtained is stable under the ordinary conditions of storage and is a clear, homogenous preparation. It has a pleasing taste but may be flavored and colored, if desired. The aqueous solution may be administered in therapy or used for further pharmaceutical manufacture. In this manner, solutions of hydrocortisone may be prepared to contain as much as 1.25 mg. of hydrocortisone, per ml. of solution. This represents an increase in solubility of hydrocortisone in an aqueous fluid, of approximately four times that of the known solubility of hydrocortisone.

When an alcohol solution of hydrocortisone of the same concentration as described above, but which is prepared without cyclohexylsulfamic acid, is diluted with water, so that the concentration per ml. of hydrocortisone is not greater than 1.25 mg. hydrocortisone per ml. of diluted solution, precipitation occurs in a matter of minutes. In contrast to this behavior of hydrocortisone, the presence of cyclohexylsulfamic acid as in the present solution, in a concentration ratio of not less than 1 part of cyclohexylsulfamic acid for each two parts of hydrocortisone, results in a clear, stable solution, without precipitation.

EXAMPLE 4

When an increased solubility of hydrocortisone is desired to facilitate the administration of this compound by internal use, then pharmaceutically acceptable aqueous solutions, such as 70 percent sorbitol, glycerin-water, and sugar syrups, may be used in place of the water described above to dilute the alcohol concentrate solution. It is important to observe a good pharmaceutical technique when diluting the alcohol concentrate solution with a sugar syrup, since sugar will precipitate during the early dilution steps, but will redissolve as the aqueous concentration increases. Consequently, the addition of the sugar syrup to the alcohol solution concentrate should be conducted with due care to avoid losses.

Similar adjustments in the technique of diluting alcohol concentrate solutions will be required for polyhydroxy compounds such as sorbitol, during the initial phases of the dilution of the alcohol solution concentrate. An alternate procedure is to first dilute the alcohol concentrate with a volume of water equal to about 50 percent of the final volume and then to dissolve the required concentration of sugar or sorbitol and finally completing the dilution to the desired volume with additional water.

EXAMPLE 5

Should it be desired to prepare an aqueous solution of hydrocortisone to contain amounts as high as 5.0 mg. of hydrocortisone per unit dose, 1 teaspoonful, (5 ml.), then this may be achieved by adding to a solution of 1.0 gm. of cyclohexylsulfamic acid, dissolved in 90 ml. of ethyl alcohol, U.S.P., 2 gm. of hydrocortisone alcohol in small increments. The mixture is stirred for a period of about 10 minutes and filtered. The solution is then mixed with 62.5 ml. of a 70 percent (by weight) aqueous solution of d-sorbitol. The mixture is stirred and filtered. To this mixture is then added sufficient water to bring the volume up to 2 liters. Suitable antimicrobial preservatives may be added, if desired, as well as flavoring agents and colors. The mixture is then filtered through a sintered glass filter and packaged into desired unit dispensing containers. The solution is clear and homogenous and has a pH of between pH 2.3 and pH 2.6. If it is desired to increase the pH of the solution, then this may be accomplished with any of the well known pharmaceutical pH buffers, as for example, sodium acid phosphate, to achieve a pH within the pH range of from pH 2.3 to pH 5.5. The solution will be found to be stable over this pH range. This solution now contains a concentration of hydrocortisone per unit dose of approximately 5.0 mg. per 5 ml. and represents an increase of about 4 times over that of the older, well known solubility of hydrocortisone.

This solution may also be utilized as a vehicle for other pharmaceutically active ingredients which may be added. Examples of such compounds are:

| Compound | Concentrations per 5 ml. of solution |
|---|---|
| Tetracycline hydrochloride | 250–500 mg. |
| Tetracycline phosphate | 250–500 mg. |
| Tetracycline | 250–500 mg. |
| Erythromycin glucoheptinate USP | 200–600 mg. |
| Erythromycin lactobianate | 200–600 mg. |
| Erythromycin propionate | 200 mg. to 1 gm. |
| Oleandomycin phosphate | 100 mg. to 500 mg. |
| Oxytetracycline | 250 mg. to 1 gm. |
| Acetylsalicylic acid | 6 mg. to 600 mg. |
| Chlorpheniramine maleate | 1 to 5 mg. |

The addition of these other active agents to the hydrocortisone does not interfere with its properties in solution and in addition to the advantage of having an elevated concentration of hydrocortisone which permits a more flexible therapeutic regimen. The individual daily amount of these preparations to be administered will depend upon the individual patient needs. A particular advantage of the above solution is the absence of sugar since, in this manner, solutions of pharmaceutical syrup consistency can be prepared for those patients in whom the intake of sugar must be restricted.

EXAMPLE 6

When it is desired to prepare an ophthalmic solution containing elevated quantities of hydrocortisone per cc. of solution, then this may be achieved by preparing the alcohol concentrate containing the appropriate quantities of cyclohexylsulfamic acid and hydrocortisone as described in Example 3 above, then diluting the concentrate with water in a ratio of 1 part concentrate and 39 parts of water. The solution is then filtered through a sintered glass filter. An ophthalmic buffer may be added so that the pH of the resultant solution is approximately pH 5. A film-forming agent, such as carboxymethylcellulose, polyvinylpyrrolidone, dextran or gelatin, may be added at a concentration of 0.1 to 0.5 percent and the whole rendered isotonic. An ophthalmic antibacterial preservative, such as chlorbutanol, may be added to ophthalmic solutions intended to be used more than once and the concentration of chlorbutanol which may be used is 0.5 percent. Other antibacterial agents may be included, as for example, the mercury derivatives, should these be desired. Propionic acid may also be added as an active ingredient in addition to the above compounds to serve as an antifungal and antimicrobial agent.

EXAMPLE 7

Should the suppository route be desired then the diluted solution, as prepared according to Example 3, above, may be mixed with a suitable suppository base to prepare suppositories, containing the desired quantity of hydrocortisone per unit suppository. In preparing such suppositories, the solution is mixed with the molten suppository base, as for example, polyoxyethylene glycol compounds having a molecular weight of between 1000 and 6000, and allowed to harden. The melting point of the suppository should be about 39°–40° C. A concentration of hydrocortisone per unit suppository may range from 0.5 to 12.5 mg. per unit dose.

When lipid substances are used as suppository vehicles, as for example, cocoa butter, then from 1 percent to 3 percent of sorbitol polyoxyethylene stearate or other similar emulsifying agent, preferably those belonging to the class of compounds which are known in the trade as "Spans" and "Tweens," should be added. The ingredients are all mixed together and then homogenized while in the molten state. When the emulsion has been completed, the suppositories are cooled and shaped in the desired sizes. Suppositories may be prepared having a weight of from 1 to 3 gms. per suppository.

EXAMPLE 8

When it is desired to utilize an increased concentration of hydrocortisone as a topical wet dressing or an irrigating solution, then the solution as described in Example 3 above may be utilized. The solution is applied to the skin and mucous membranes either as a compress or emulsified in an ointment or lotion so that each cc. contains up to 1.25 mg. of hydrocortisone. The preparation is applied to the skin or mucous membranes from 1 to 6 times daily.

In order to prepare a shampoo, appropriate foaming and sudsing agents may be added to the solution prepared according to Example 3, and this is then utilized in the conventional manner. When preparing the shampoo, a non-ionic detergent or an acid detergent must be utilized so that the pH of the final solution is between pH 2.3 and pH 5.

When used to irrigate a wound, the solution as described in Example 3, may be used and this may be added directly to the irrigating solution or used alone. The irrigation fluid is administered under pressure to infiltrate the entire wound area.

EXAMPLE 9

Should it be desired to utilize a solid dosage form for the administration of the new liquid solution, then a modification of the solution prepared as described in Example 3 above, may be utilized for filling into capsules. However, in preparing a liquid filled capsule, the water content of the solution must be not greater than 10 percent. The solution for filling into capsules, the solution of hydrocortisone cyclohexylsulfamic acid is prepared, as described in Example 3 above, and to this solution is added an amount equal to 90 percent of the volume of the solution prepared of propylene glycol. The mixture distilled at a pressure of 0.2 mm./Hg, so that the concentration of water in the mixture is reduced below 10 percent. The distillation is stopped and the mixture filled into gelatin capsules of suitable size and shape. An advantage of this form of therapy is to provide a convenient means for administering a liquid preparation which is readily adaptable to the demands of travel conditions.

EXAMPLE 10

Should it be preferred to use hydrocortisone cyclohexylsulfamate in therapy, then this may be administered in the form of capsules, granules, powders, suppositories, and liquid preparations such as solutions. For topical administration, ointments, creams and lotions may be utilized.

Tablets may be prepared by mixing from 1 part of the hydrocortisone cyclohexylsulfamate with from 10 parts to 100 parts of pharmaceutically acceptable diluent, as for example, corn starch, lactose, sucrose, mannitol, sorbitol or dextrose, and granulating this mixture with a granulation solution consisting of 1% to 2% gum acacia or gum tragacanth in 50 percent alcohol-water. When the mass has been wetted with this solution, it is passed through a granulating screen and air dried. To the dried granulated powder is now added a pharmaceutically acceptable tablet lubricant such as magnesium stearate and the mixture compressed into tablets of suitable size and shape, so that each tablet contains from 0.5 mg. to 25 mg. of hydrocortisone cyclohexylsulfamate.

Should it be preferred to use capsules as the dosage form, then the dry mixture of hydrocortisone cyclohexylsulfamate and the pharmaceutically acceptable diluent, as described above, may be filled directly into a gelatin capsule of suitable size and shape to contain from 0.5 mg. to 25 mg. per capsule.

Granules are prepared by granulating the mixture of hydrocortisone cyclohexylsulfamate and the diluent, as described above, with a pharmaceutically acceptable granulating solution and passing the mixture through a #8 standard mesh sieve. The particles are then air dried. The concentration of hydrocortisone cyclohexylsulfamate per unit dose (1 teaspoonful) of the granules is from 0.5 to 25 mg.

Ointments, lotions and creams are prepared by dissolving the appropriate quantity of hydrocortisone cyclohexylsulfamate in the pharmaceutically acceptable respective ointment, cream or lotion vehicle. This may be accomplished by direct dissolution of the active material in the vehicle or preferentially dissolving the active material in one of the phases of said vehicle, preferably the aqueous phase. The range in concentration of hydrocortisone cyclohexylsulfamate in the ointment, cream or lotion is from 0.5 mg. to 25 mg. per gram or ml. of carrier.

Suppositories are prepared by dispersing the appropriate quantity of hydrocortisone cyclohexylsulfamate in pharmaceutically acceptable suppository bases, such as polyoxyethyleneglycol, having a molecular weight of between 1,000 and 6,000, cocoa butter, cetyl alcohol, spermaceti or mixtures of these. After uniform distribution of the active material has been achieved, the suppositories are shaped into proper size so that each suppository, weighing between 1 and 2 gm., contains from 0.5 to 25 gms. of hydrocortisone cyclohexylsulfamate.

EXAMPLE 11

Hydrocortisone cyclohexylsulfamate may be administered to humans and animals in combination with other active ingredients, in order to provide an enhanced therapeutic effect. These combinations may be utilized with any of the dosage forms found convenient for the therapeutic administration for the respective compounds. Active ingredients which may be combined with hydrocortisone cyclohexylsulfamate are as follows:

| Compound: | Concentration per unit dose |
|---|---|
| Tetracycline hydrochloride | 250–500 mg. |
| Tetracycline phosphate | 250–500 mg. |
| Tetracycline | 250–500 mg. |
| Erythromycin glucoheptinate USP | 200–600 mg. |
| Erythromycin lactobianate | 200–600 mg. |
| Erythromycin propionate | 200 mg. to 1 gm. |
| Oleandomycin phosphate | 100 mg. to 500 mg. |
| Oxytetracycline | 250 mg. to 1 gm. |

| Compound: | Concentration per unit dose, mg. |
|---|---|
| Acetylsalicylic acid | 60–600 |
| Chlorpheniramine maleate | 1–5 |
| Dexamethasone | 0.25 |
| Meprobamate | 200–400 |
| Promazine | 10–25 |
| Ephedrine | 25–50 |

The dosage range of hydrocortisone cyclohexylsulfamate which is used in combination with the above active listed ingredients is from 2 mg. to 50 mg. per unit dose.

The dosage forms containing the combined active ingredients are administered from 1 to 6 times daily.

EXAMPLE 12

In order to achieve an elevated blood level of hydrocortisone, then the preparations obtained as a result of Examples 1 through 11, may be administered from 1 to 6 times daily. The total daily dosage of hydrocortisone cyclohexylsulfamate administered to the patient may range from 2 mg. to 50 mg. per day, depending upon the patient's needs, the nature of the disease and its severity. An elevated blood level of hydrocortisone will be observed to occur within 15 minutes after administration of the therapeutic agent and will persist for a period of from 4 to 6 hours. Hydrocortisone cyclohexylsulfamate possesses the full therapeutic spectrum of hydrocortisone and its range of indications in therapy is the same as that of hydrocortisone.

What is claimed is:

1. Hydrocortisone cyclohexylsulfamate.
2. The method of preparing hydrocortisone cyclohexylsulfamate which comprises the steps of adding hydrocortisone to an equimolar quantity of cyclohexylsulfamic acid dissolved in a liquid alkanol selected from the group consisting of liquid alkanols of from 1 through 4 carbons in chain length, refluxing said mixture, evaporating said alkanol solvent, extracting with chloroform, evaporating said chloroform extracting solvent and recovering hydrocortisone cyclohexylsulfamate therefrom.
3. The method of claim 2, said liquid alkanol being ethanol.
4. The method of increasing the solubility of hydrocortisone in aqueous fluids which comprises the steps of dissolving cyclohexylsulfamic acid in ethanol, adding two parts of hydrocortisone for each part of cyclohexylsulfamic acid, stirring until complete solution is achieved, diluting with an aqueous fluid selected from the group consisting of water, 70 percent aqueous sorbitol, aqueous propylene glycol and sugar syrups.
5. A pharmaceutical vehicle for therapeutically active compounds comprising cyclohexylsulfamic acid, two parts hydrocortisone for each part cyclohexylsulfamic acid and an essentially aqueous solvent.
6. A pharmaceutical composition comprising a pharmaceutically acceptable carrier and from 0.5 mg. to 50 mg. of hydrocortisone cyclohexylsulfamate.
7. A pharmaceutical composition of claim 6, said composition being a tablet.
8. A pharmaceutical composition of claim 6, said composition being a capsule.
9. A pharmaceutical composition of claim 6, said composition being a suppository.
10. A pharmaceutical composition of claim 6, said composition being a solution for parenteral administration.
11. A pharmaceutical composition of claim 6, said composition being a syrup.
12. A pharmaceutical composition of claim 6, said composition being an ophthalmic solution.
13. A pharmaceutical composition of claim 6, said composition being an ointment.
14. The method of achieving an elevated blood level of hydrocortisone which comprises the step of administering to a patient a therapeutically sufficient quantity of the compound of claim 1.
15. The method of claim 14, which comprises the step of administering to a patient a therapeutically sufficient quantity of the composition of claim 6.
16. The method of claim 14, which comprises the step of administering to a patient a therapeutically sufficient quantity of an essentially aqueous solution containing one part cyclohexylsulfamic acid and two parts by weight of hydrocortisone.
17. A pharmaceutical composition comprising a pharmaceutically acceptable carrier and from 0.5 to 50 mg. of hydrocortisone cyclohexylsulfamate and a therapeutically sufficient quantity of a compound selected from the group consisting of antibiotics, analgesics and sedatives.

References Cited

UNITED STATES PATENTS 3,123,598   3/1964   Tuba et al. _____ 260—239.5

LEWIS GOTTS, *Primary Examiner.*

D. G. RIVERS, *Assistant Examiner.*

U.S. Cl. X.R.

260—397.45